Sept. 21, 1965      W. R. CROOKS      3,207,424

FLOW CONTROL FOR SCREW COMPRESSORS

Filed June 7, 1963      5 Sheets-Sheet 1

INVENTOR.
WILLIAM R. CROOKS
BY

ATTORNEYS

INVENTOR.
WILLIAM R. CROOKS
BY
ATTORNEYS

INVENTOR.
WILLIAM R. CROOKS

Sept. 21, 1965 W. R. CROOKS 3,207,424
FLOW CONTROL FOR SCREW COMPRESSORS
Filed June 7, 1963 5 Sheets-Sheet 4
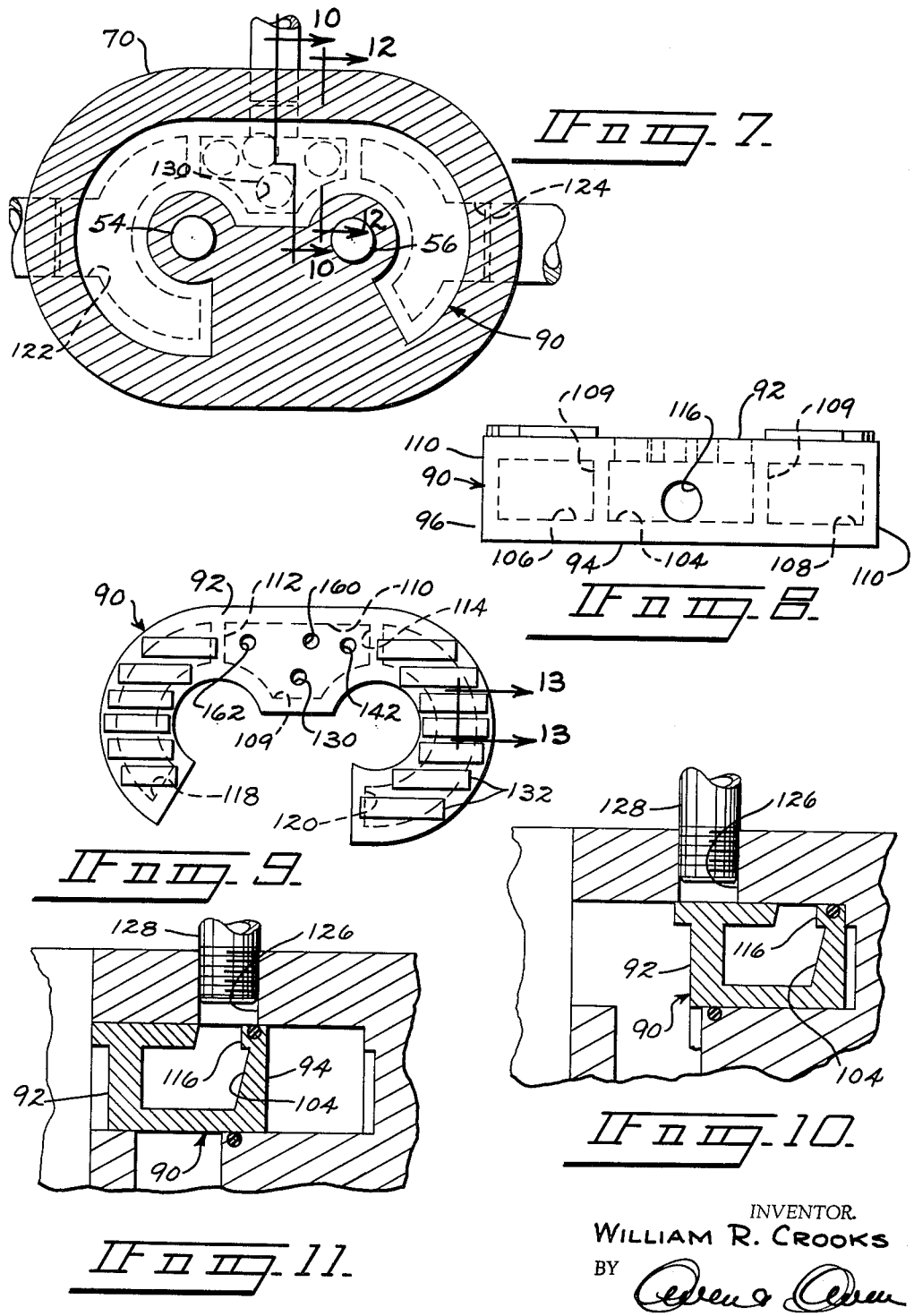
INVENTOR.
WILLIAM R. CROOKS
BY
ATTORNEYS Sept. 21, 1965 W. R. CROOKS 3,207,424
FLOW CONTROL FOR SCREW COMPRESSORS
Filed June 7, 1963 5 Sheets-Sheet 5
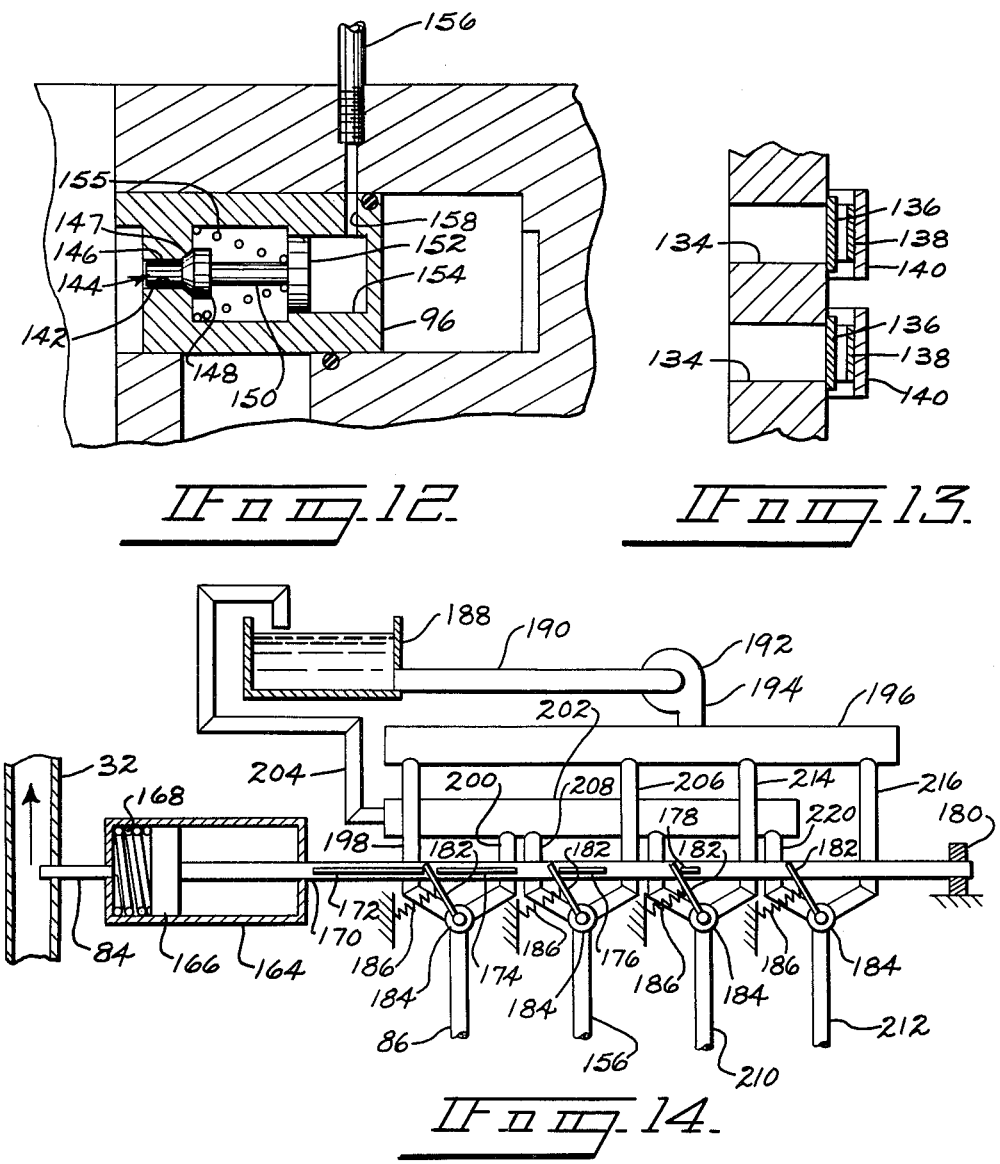
INVENTOR.
WILLIAM R. CROOKS
BY
ATTORNEYS

United States Patent Office 3,207,424
Patented Sept. 21, 1965

3,207,424
FLOW CONTROL FOR SCREW COMPRESSORS
William R. Crooks, Mount Vernon, Ohio, assignor to The Cooper-Bessemer Corporation, Mount Vernon, Ohio, a corporation of Ohio
Filed June 7, 1963, Ser. No. 286,364
13 Claims. (Cl. 230—138)

This invention relates to flow control means for a screw compressor for regulating gas flow during periods of reduced demand.

Screw compressors are finding increased use but the applications are somewhat limited because efficiency is not as high as desirable when demand is equal to something less than the full output or capacity. This is particularly true for screw compressors employing constant speed motors for the drive unit, which motors are desirable because of their substantially lower cost.

In a reciprocating compressor, flow control is relatively easy, even with a constant speed drive, because output can be changed simply by changing the clearance volume of the compressor or by lifting some of the valves off their seats, or both. These expedients provide good flow control with gas discharged under full pressure, and yet with a minimum amount of drive energy being required for less than full output.

In screw compressors, flow control has been attempted in several ways. One common technique has been to employ a relief valve adapted to open when demand is decreased and output pressure rises. While this is simple, constant horsepower is required regardless of the output requirements. The second method has involved opening discharge ports in the compressor housing upstream of the main discharge port to decrease the effective length of the screws. This has been successively used down to approximatly 50 percent of capacity, at which point about 70 percent of full load horsepower is required. Below approximately 50 percent maximum volume, however, a relief valve is needed so that the horsepower requirements are not reduced any further. In a third technique, automatic valves have been employed in the suction and discharge lines of screw compressors to throttle flow through the compressor, with the discharge line connected to the suction line to reduce discharge pressure. The compressor still must compress the reduced flow of gas through the pressure ratio built into the machine and tends to operate at either zero capacity or maximum capacity. The no-load and reduced load power requirements in this instance again are much higher than desired and much higher than corresponding requirements of reciprocating compressors.

The present invention relates to improved means for controlling reduced output in screw compressors so that reduced and no-load power is comparable with that of reciprocating compressors under reduced and no-load conditions. The improved flow control in accordance with the invention is accomplished by re-cycling a portion of the compressed gas to the suction side of the compressor so that this portion again passes through the compressor at initial high pressure and actually does work on the screws during the re-cycling. Means are provided for increasing the amount of re-cycled gas in steps as the demand decreases and at the same time decreasing the amount of uncompressed gas employed.

It is, therefore, a principal object of the invention to provide flow control means for a screw compressor for reducing power requirements of a constant speed drive at reduced rates of demand.

Other objects and advantages of the invention will be apparent from the following detailed description of a preferred embodiment thereof, reference being made to the accompanying drawing, in which:

FIG. 7 is a rear view on a reduced scale of the flow control member of the invention and with the housing in cross section;

FIG. 8 is a top, plan view of the flow control member shown in FIG. 7;

FIG. 9 is a front view in elevation of the flow control member;

FIG. 10 is a fragmentary view in vertical cross section taken along the line 10—10 of FIG. 7;

FIG. 11 is a fragmentary view in vertical cross section similar to FIG. 10, but with the flow control member in a forward, operative position;

FIG. 12 is a view in vertical cross section taken generally along the line 12—12 of FIG. 7, but with the flow control member in the forward position;

FIG. 13 is an enlarged, fragmentary view in vertical cross section taken along the line 13—13 of FIG. 9; and FIG. 14 is a somewhat schematic view of controls used to operate the flow control member and to operate certain valves therein.

Figure 1:
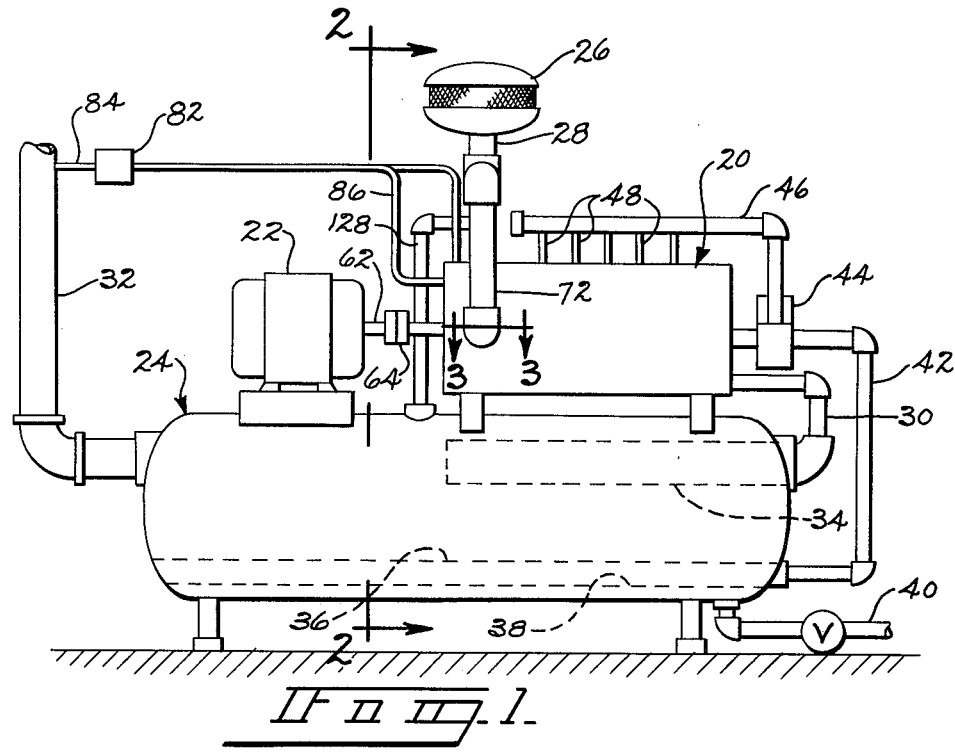
FIG. 1 is a side view in elevation of a screw compressor, drive unit, tank, and related components in accordance with the invention.
Figure 2:
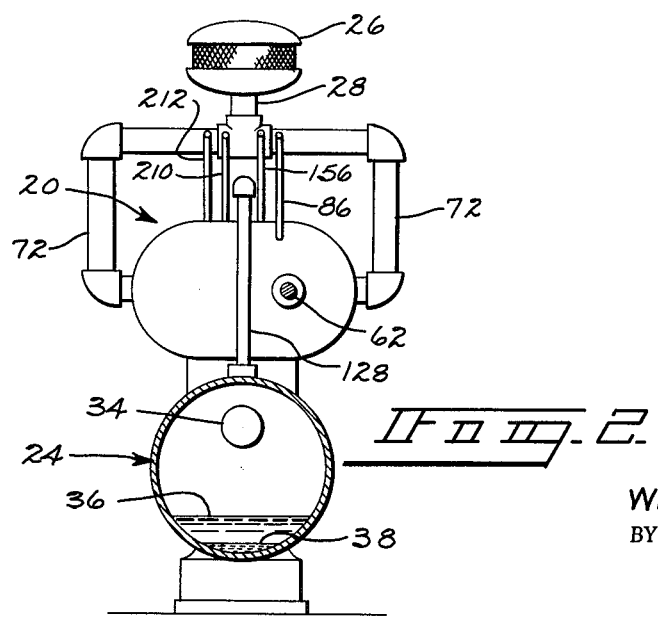
FIG. 2 is a left end view of the screw compressor of FIG. 1, taken along the line 2—2 of FIG. 1.

Referring to FIGS. 1 and 2, an overall gas compressing system embodying the invention includes a screw compressor 20, a constant speed drive unit or motor 22, and a tank or receiver 24. Air or other gas is supplied through an inlet filter 26 and an inlet line 28 to the inlet end of the compressor 20. After compression, the gas flows from the outlet end through a line 30 to the tank 24 and, hence, out an outlet line 32 where it is carried to the point or points of use, which may be widespread, particularly in the case of factory or shop air applications. Oil which is mixed with the gas in the compressor 20 is separated by an oil separator 34 in the tank 24 with the oil then collecting at the bottom of the tank in a supply pool 36 above a sludge sump 38. The sump 38 is periodically drained to waste through a line 40. Oil in the pool 36 is drawn off through a supply line 42 and is then forced by a pump 44 back into the screw compressor through a main line 46 and branch lines 48. The oil in the compressor forms an improved seal between the screws even though they do not touch one another, as is well known in the art.

Figure 3:
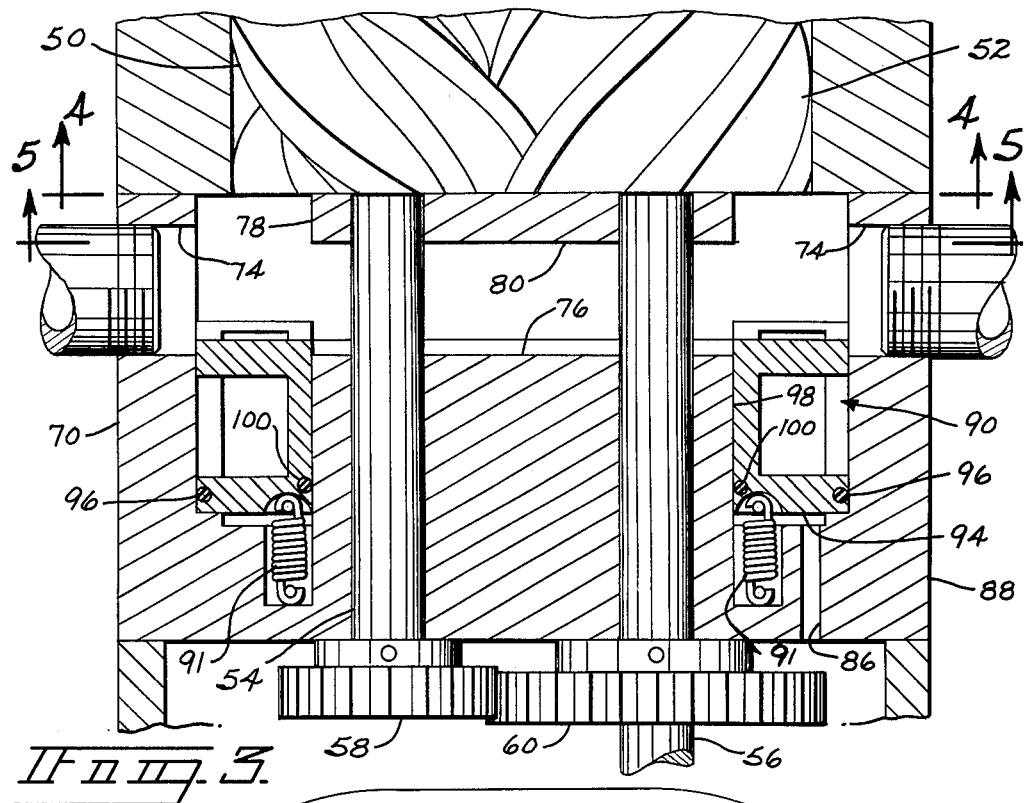
FIG. 3 is a fragmentary view in horizontal cross section of an inlet end of the compressor taken along the line 3—3 of FIG. 1.
Figure 4:
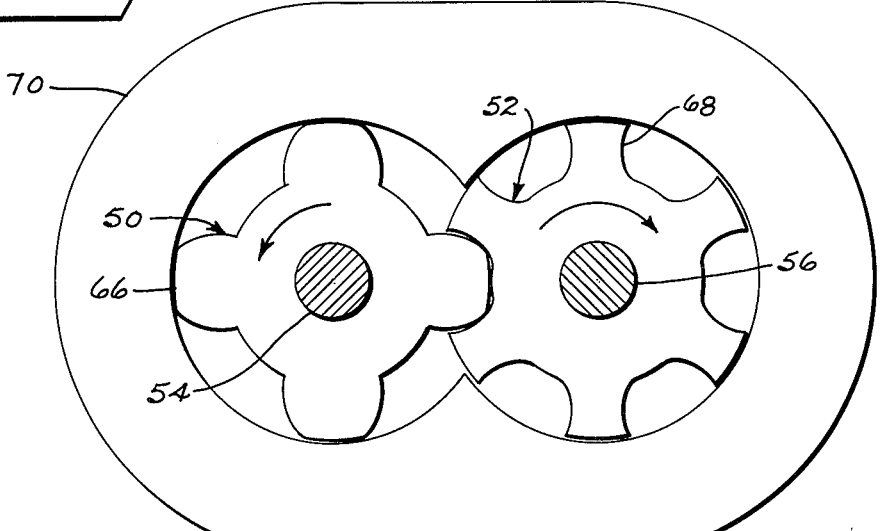
FIG. 4 is a somewhat schematic end view of the compressor screws taken from the inlet end of the compressor, along the line 4—4 of FIG. 3.

Referring now more particularly to FIG. 4, male and female compressor screws 50 and 52 are shown somewhat schematically and are rotatably mounted on shafts 54 and 56 so that they preferably do not touch one another at any point during rotation. The two shafts are connected by suitable gears 58 and 60 (FIG. 3) with the shaft 54 in this instance being driven by a motor shaft 62 (FIG. 1), being connected thereto by a coupling 64. Teeth 66 and 68 (FIG. 4) fit closely with the inner surface of a compressor housing 70 and sweep gas at the inlet end into a pocket between the teeth with the gas then being carried through the pocket, which decreases in volume throughout the length of the screws 50 and 52, and expelled from the discharge end of the screws. This type of compressor is known in the art and, therefore, will not be discussed in detail. The space above the nip of the screws 50 and 52 in FIG. 4 represents the suction side of the screws because the pocket between them increases in volume as the screws rotate in the direction shown. The space below the nip of the screws as shown in FIG. 4 represents the discharge side because the volume of the pocket decreases as the screws rotate in the direction shown. Thus, the upper side of the screws at the inlet end of the compressor 20 is at less pressure than the lower side at the same end.

Figure 5:
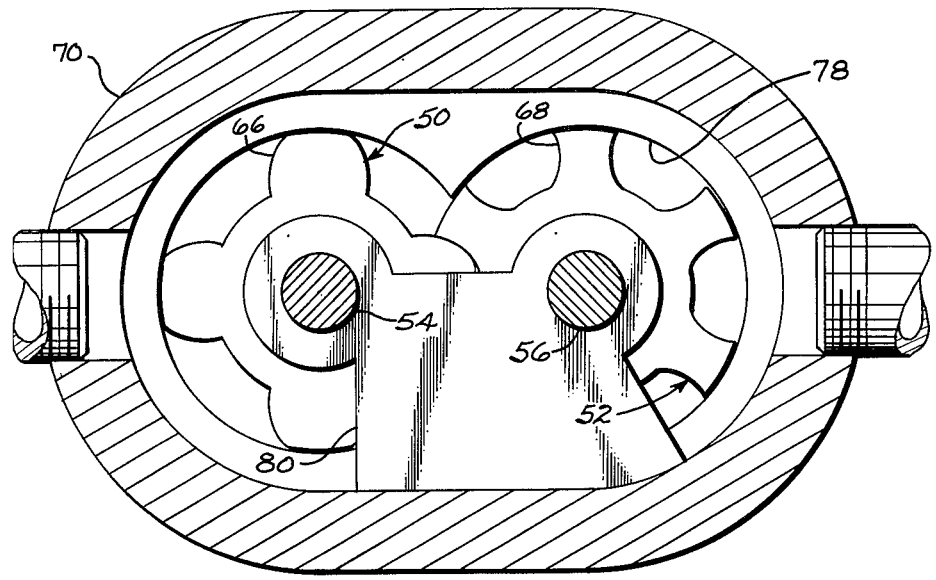
FIG. 5 is a view in cross section showing an inlet port of the compressor and its relationship to the compressor screws, taken along the line 5—5 of FIG. 3.

As shown in FIG. 2, the air inlet line 28 has two branches 72 which communicate with two inlet passages or supply means 74 (FIG. 3) terminating in an inlet chamber 76. The air or other gas is then supplied from the inlet chamber 76 to the screws 50 and 52 through an inlet opening 78 (FIGS. 3 and 5) of double arcuate shape formed between the interior of the housing 70 and a partition or wall 80 which separates the screws 50 and 52 from the inlet chamber 76 and also helps to support the shafts 54 and 56. The opening 78 enables most of the low pressure or suction side of the screws 50 and 52 to communicate with the inlet chamber 76 while most of the high pressure or exhaust side of the screws 50 and 52 are closed off by the partition 80 to prevent the escape of gas from that side.

During normal operation of the compressor system, air is drawn through the inlet filter 26, the inlet line 28, the inlet passages 74, the inlet chamber 76, and the arcuate inlet opening 78 where it is compressed by the screws 50 and 52 and subsequently discharged under higher pressure into the tank 24. After the oil has been separated, the air is supplied through the outlet line 32 to the various points of use.

Figure 6:
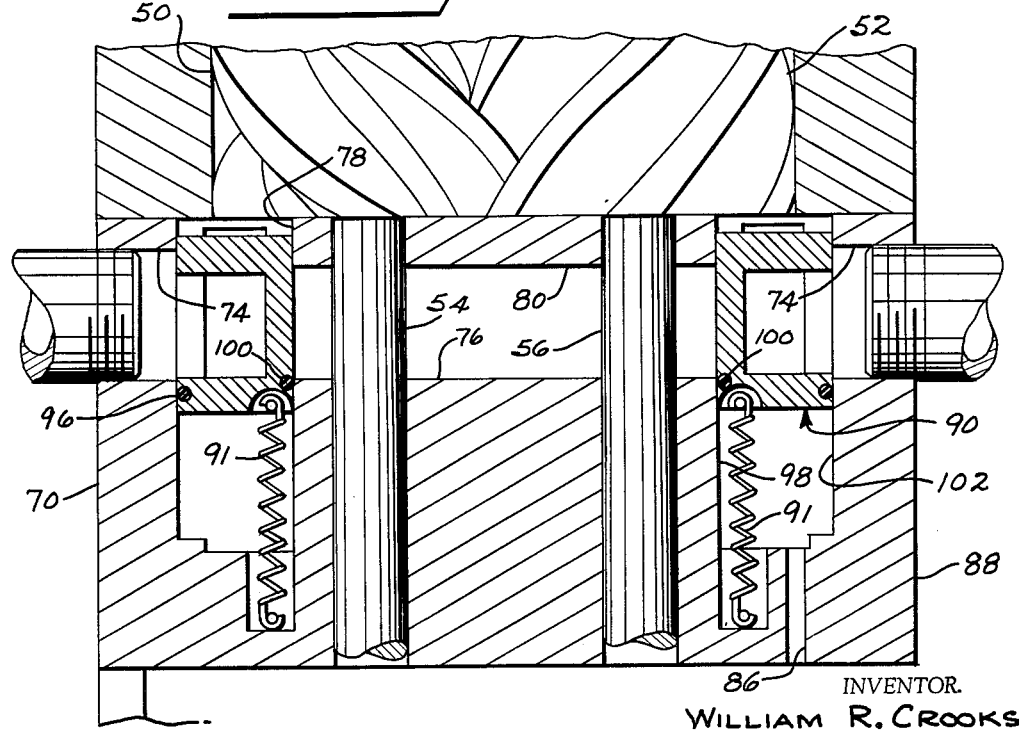
FIG. 6 is a view in horizontal cross section similar to FIG. 3, but showing a flow control member in a forward, operative position.

If the quantity of the compressed gas consumed is decreased, the pressure in the tank 24 and the outlet line 32 will increase and the increase will be sensed by a flow- or pressure-responsive unit or control 82 (FIG. 1) communicating with the outlet line 32 through a line 84. The flow-responsive unit 82 can be of many suitable types, an example of which will be discussed subsequently. When the flow in the outlet line 32 decreases to a predetermined amount, such as that existing when consumption of the gas decreases to 75 percent of the capacity of the compressor, the unit 82 supplies control fluid to a rear passage 86 (FIGS. 3 and 6) in an end wall 88 of the compressor 20. The control fluid then moves a flow control member or body 90 forwardly to the operative position of FIG. 6 to close off the inlet opening 78. When the unit 82 vents the passage 86 when the use again rises, springs 91 return the member 90 to its rear, inoperative position.

The flow control member 90 includes a front wall 92 of a configuration similar to that of the inlet opening 78 to seal off the opening 78. The member 90 also includes a rear wall 94 conforming generally to the shape of the periphery of the inlet chamber 76 having a resilient band 96 along the outer edge to provide a fluid tight seal between the rear wall 94 and the chamber 76. The rear wall 94 also has an inner periphery cooperating with a rear projection 98 extending from the end wall 88 of the compressor. The inner periphery of the wall 94 has a resilient band 100 at the inner edge thereof to provide a fluid tight seal with the projection 98. The rear wall 94 thereby forms a power chamber 102 with the end wall 88, the projection 98, and the housing 70. This enables the flow control member 90 to operate as a piston and be responsive to the control fluid supplied to and withdrawn from the chamber 102 by the control fluid passage 86.

The flow control member 90 also includes a central high pressure chamber 104 (FIGS. 7-9) and two side, low pressure chambers 106 and 108. The high pressure chamber 104 is formed between the front and rear walls 92 and 94, by an inner wall 109 which connects the inner peripheries of the rear wall 94 and the front wall 92, and by an outer wall 110 which connects the outer peripheries of the rear wall 94 and the front wall 92. The ends of the high pressure chamber 104 are defined by intermediate partitions 112 and 114; the outer wall 110 has a central opening 116 therein for the admission of high pressure gas to the chamber 104. The low pressure chambers 106 and 108 are formed by the front and rear walls 92 and 94, the inner and outer walls 109 and 110, the partitions 112 and 114 and short end walls 118 and 120 at the ends of the front and rear walls 92 and 94. The chambers 106 and 108 also have openings 122 and 124 (FIG. 7) in the outer wall 110 for the admission of low pressure gas from the passages 74. The openings 116, 122, and 124 are sealed off when the flow control member 90 is in its rear position (FIGS. 3 and 10) but communicate with a high pressure port 126 (FIG. 11) and the inlet passages 74 (FIG. 6) when the volume control 90 is in its forward position. At that time, high pressure gas from the tank 24 is supplied to the high pressure chamber 104 through a high pressure line or passage means 128 and the port 126, while low pressure gas is supplied to the chambers 106 and 108 from the inlet line 28.

The gas supplied to the high pressure chamber 104 is admitted through a first unrestricted high pressure port 130 to the suction side or inlet end of the screws 50 and 52, just above the nip. The port 130 is sized so that approximately 25 percent of the gas capacity of the compressor is supplied through this port. At the same time, the remaining 75 percent of the gas is supplied to the chambers 106 and 108 and drawn into the inlet end of the screws through a multiplicity of pressure sensitive valves 132 (FIG. 9) which, in this instance, are in the form of slot valves. These valves open each time the pressure at the suction end of the screws drops below a predetermined amount and thereby supply the remaining 75 percent of the gas to the suction end.

The valves 132 can be of any suitable type, one of which is shown in detail in FIG. 13. Accordingly, a plurality of elongate openings or slots 134 are formed in that portion of the front wall 92 which communicates with the chambers 106 and 108. The screw side of the openings 134 are covered by valve plates or strips 136 which are held in fluid-tight relationship around the openings 134 by leaf springs 138. The springs 138, in turn, are urged against the valve plates 136 by U-shaped guards 140 which are affixed to the wall 92 around the openings 134 and are spaced apart so that the gas passing through the openings 134 can escape between the guards.

With approximately 25 percent of the gas flowing through the high pressure port 130, substantially all of the valves 132 will be opened to admit the remaining 75 percent of low pressure gas or atmospheric air to the compressor. The high pressure gas supplied from the tank 24 through the port 130 to the suction side of the screws 50 and 52 enters the pocket therebetween and does work on them, with the screws thereby acting in part as a motor. Consequently, the load on the drive motor 22 is reduced substantially by this expedient.

If the rate of consumption should decrease further, so that the flow through the discharge line 32 will correspondingly decrease and the pressure therein tend to increase, a second high pressure port 142 will be opened, this port being of about the same diameter as the port 130. With the port 142 open, approximately 50 percent of the total volume output of the compressor will then be supplied through the ports 130 and 142 from the tank 24. The remaining 50 percent will be supplied through the valves 132 with fewer of the valves being opened, however, as the suction will be less and the pressure differential across the valve plates 136 will also be less.

The opening and closing of the second port 142 is controlled by a valve 144 (FIG. 12) having a cylindrical guide projection 146 extending into the port 142 and a shoulder 147 seating on a beveled seat 148 around the port 142. The valve 144 can open and close the port 142 by any suitable control means which is responsive to either the volume or pressure of the compressed gas. For this purpose, by way of example, the valve 142 includes a rearwardly extending valve rod 150 which is connected to a valve piston 152 in a cylinder 154 formed in the rear wall 94. A valve spring 155 is in compression to urge the valve 144 away from the port 142. However, as will be discussed subsequently, the control unit 82 causes fluid under pressure to be supplied through a supply line 156 and a supply passage 158 in the rear wall 94 to the cylinder 154. The pressure forces the piston 152 outwardly to maintain the valve 144 in a closed position until the gas consumption falls to 50 percent of the compressor capacity. At that point, the control unit 82 vents the cylinder 154 to enable the spring 156 to push the valve 144 to the open position. High pressure air in an amount of 25 percent of the total capacity of the compressor 22 then flows from the high pressure chamber 104 through the port 142, with 50 percent of the total capacity of the compressor being supplied through the high pressure ports 130 and 142.

A third high pressure port 160 (FIG. 9) and a fourth high pressure port 162 are also located in the high pressure chamber 104 to supply high pressure air from the chamber 104 to the compressor screws, when the ports are opened. For this purpose, both of the ports 160 and 162 are provided with valves which are substantially identical to and operate in a manner similar to the valve 144. As will be discussed subsequently, the control unit 82 opens the valve for the third high pressure port 160 when consumption falls to 25 percent of the output of the compressor 22. The valve for the port 162 opens when gas consumption approaches zero, at which time all gas passing through the compressor is high pressure, recycled gas.

As pointed out before, the high pressure gas helps to drive the screws, performing work on them, so that the load on the drive unit 22 is kept to a minimum. With this arrangement, the horsepower required at zero capacity will be in the order of only 25 percent of that required at 100 percent capacity and will be comparable to loads on the prime movers of reciprocating compressors when operating at less than 100 percent capacity. The following table illustrates the horsepower and efficiency which can be obtained from a screw compressor with a flow control system according to the invention:

| Capacity in percent | Capacity, s.c.f.m. | Horsepower Required | Overall efficiency |
| --- | --- | --- | --- |
| 100 | 100 | 20.6 | 83.6 |
| 75 | 75 | 16.4 | 79.0 |
| 50 | 50 | 12.4 | 70.0 |
| 25 | 25 | 8.3 | 52.0 |
| 00 | 00 | 4.0 | 0.0 |

The control unit 82 can be of many varieties with that of FIG. 14 being illustrated and discussed for purposes of explanation. The control line 84 of the control unit 82 extends into the discharge line 32 with the end of it being shaped to establish a suction in the line as the flow of compressed gas past it increases, according to the Bernoulli principle. The suction or negative pressure is transmitted to a control cylinder 164, thereby urging a control piston 166 toward the left against a spring 168. The piston 166 is in its extreme left hand position when flow through the discharge line 32 is at 100 percent of capacity of the compressor and is shown in this position in FIG. 14. The piston 166 is connected to a control rod 170 having four ears or tabs 172–178 thereon, with the free end of the control rod 170 being supported in a suitable guide 180. The tabs 172–178 cooperate with handles 182 of valves 184, which are substantially identical. The valves 184 are held in the positions shown by springs 186 when the control rod 170 is in its left hand position. The first valve 184 is associated with the line or passage 86 and controls the supply of fluid to the power chamber 102. A supply of control fluid for the passage 86 is provided by means of a sump 188 connected by an inlet line 190 to a pump 192 and, hence, through an outlet line 194 to a supply manifold 196. This is connected to the passage 86 through a supply branch line 198.

The line 86 also can be connected to a return system for the control fluid through a return branch line 200, a return manifold 202, and a return line 204 connecting the return manifold 202 to the sump 188. In the position shown, the line 86 is connected to the return or vent line 204 so that the chamber 102 is not under pressure and the control member 90 remains in its rear, inoperative position.

As the gas consumption decreases and the flow of gas in the discharge line likewise decreases, the suction in the cylinder 164 decreases and the spring 168 moves the piston 166 toward the right. The first moves the valve 184 for the control line 86 to its second position to connect the control line 86 with the supply line 198 and the manifold 196. Fluid under pressure is then supplied through the line 86 to the chamber 102 and drives the control member forwardly to the operative position of FIG. 6.

The second valve 184 is connected to the valve control line 156 which is connected to the supply passage 158 and the valve cylinder 154 for the valve 144. The line 156 can be connected to the supply manifold 196 through a branch line 206 or can be connected to the return manifold 202 through a return branch line 208. In the position shown, and when flow through the discharge line 32 exceeds approximately 50 percent of the capacity of the compressor 20, the valve 184 for the line 156 is in the left hand position so that the line 156 is connected to the pressurized fluid. This fluid is transmitted to the cylinder 154 and keeps the valve 144 in the closed position. When the consumption drops below 50 percent of the capacity of the compressor 20, the piston 166 is moved further toward the right by the spring 168 and moves the handle 182 for the second valve 184 to the right, with the second tab 174 engaging the handle. The branch line 156 is then connected to the exhaust or venting manifold 202 which vents the cylinder 154 and enables the spring 155 to open the port 142 by moving the valve 144 away therefrom. Then 50 percent of the air to the compressor 20 is supplied through the high pressure ports 130 and 142.

The third and fourth valves 184 are associated with control lines 210 and 212 and are connected to the manifold 196 through supply branch lines 214 and 216 or are connected to the venting manifold 202 through branch lines 218 and 220. The cylinders for the third and fourth ports 160 and 162 are then subjected to pressure or exhaust in the same manner as the cylinder 154 with the valves for the ports 160 and 162 normally being closed but being open as the control rod 170 moves toward the right and moves the valves 184 associated with the lines 210 and 212 toward the right to vent these lines. The third valve 184 is moved when the flow drops to about 25 percent of capacity and the fourth valve 184 is moved when the flow approaches zero.

Various modifications of the above described embodiment of the invention will be apparent to those skilled in the art and it is to be understood that such modifications can be made without departing from the scope of the invention, if they are within the spirit and the tenor of the accompanying claims.

What I claim is:

1. In a screw compressor including a compressor housing having an inlet end and an outlet end, a male screw and a female screw driven in synchronization in said housing, said screws rotating in opposite directions to establish a suction side and a discharge side, said housing having wall means defining an inlet chamber and an opening connecting the inlet chamber with the suction side of said screws, supply means for supplying gas to said inlet chamber, a receiver, means connecting the outlet end of said housing to said receiver, outlet means connecting said receiver to a point of use for the gas, passage means for connecting said receiver to the inlet chamber of said housing, a flow control body having at least a high pressure chamber and a low pressure chamber, said body having an inoperative position and an operative position, said body being movable within the inlet chamber from the inoperative position preventing flow through said passage means and out of the way of said gas supply means to the operative position in which the high pressure chamber communicates with said passage means and the low pressure chamber communicates with said gas supply means, high pressure valve means in said body between said high pressure chamber and the suction side of said screws, means including part of said housing and part of said body forming a power cylinder, means responsive to the amount of gas used for supplying power fluid to said power cylinder to control the position of said body and for moving said body from the inoperative position to the operative position when the volume of gas used falls to a first predetermined amount, means for moving said body from the operative position to the inoperative position when the volume rises above said first predetermined amount, means responsive to the volume of gas used for controlling the positions of said valve means and for opening said valve means when the volume of gas used falls to a second predetermined amount below the first predetermined amount, and additional valve means in said body between said low pressure chamber and the suction side of said screws, the opening and closing of said additional valve means being responsive to the pressure differential thereacross.

2. In a screw compressor including a compressor housing having an inlet end and an outlet end, a male screw and a female screw driven in synchronization in said housing, said screws rotating in opposite directions to establish a suction side and a discharge side, said housing having wall means defining an inlet chamber and an opening connecting the inlet chamber with the suction side of said screws, supply means for supplying gas to said inlet chamber, a receiver, means connecting the outlet end of said housing to said receiver, outlet means connecting said receiver to a point of use for the gas, passage means for connecting said receiver to the inlet chamber of said housing, a flow control body having at least a high pressure chamber and a low pressure chamber, said body having an inoperative position and an operative position, said body being movable within the inlet chamber from the inoperative position preventing flow through said passage means and out of the way of said gas supply means to the operative position in which the high pressure chamber communicates with said passage means and the low pressure chamber communicates with said gas supply means, high pressure valve means in said body between said high pressure chamber and the suction side of said screws, means responsive to the amount of gas used for controlling the position of said body and for moving said body from the inoperative position to the operative position when the volume of gas used falls to a first predetermined amount, means for moving said body from the operative position to the inoperative position when the volume rises above said first predetermined amount, means responsive to the volume of gas used for controlling the positions of said valve means and for opening said valve means when the volume of gas used falls to a second predetermined amount below the first predetermined amount, and additional valve means in said body controlling flow from said gas supply means to the suction side of said screws, the opening and closing of said additional valve means being responsive to the pressure differential thereacross.

3. In a screw compressor including a compressor housing having an inlet end and an outlet end, a male screw and a female screw driven in synchronization in said housing, said screws rotating in opposite directions to establish a suction side and a discharge side, said housing having wall means defining an inlet chamber and an opening connecting the inlet chamber with the suction side of said screws, supply means for supplying gas to said inlet chamber, a receiver, means connecting the outlet end of said housing to said receiver, outlet means connecting said receiver to a point of use for the gas, passage means for connecting said receiver to the inlet chamber of said housing, a flow control body having at least a high pressure chamber and a low pressure chamber, said body having an inoperative position and an operative position, said body being movable within the inlet chamber from the inoperative position preventing flow through said passage means and out of the way of said gas supply means to the operative position in which the high pressure chamber communicates with said passage means and the low pressure chamber communicates with said gas supply means, high pressure valve means in said body between said high pressure chamber and the suction side of said screws, means responsive to the amount of gas used for controlling the position of said body and for moving said body from the inoperative position to the operative position when the volume of gas used falls to a first predetermined amount, means responsive to the volume of gas used for controlling the positions of said valve means and for opening said valve means when the volume of gas used falls to a second predetermined amount below the first predetermined amount, and additional valve means in said body controlling flow from said gas supply means to the suction side of said screws.

4. In a screw compressor including a compressor housing having an inlet end and an outlet end, a male screw and a female screw driven in synchronization in said housing, said screws rotating in opposite directions to establish a suction side and a discharge side, said housing having wall means defining an inlet chamber and an opening connecting the inlet chamber with the suction side of said screws, supply means for supplying gas to said inlet chamber, outlet means connecting the outlet end of said housing to a point of use for the gas, passage means for connecting said outlet means to the inlet chamber of said housing, a flow control body having at least a high pressure chamber and a low pressure chamber, said body having an inoperative position and an operative position, said body being movable within the inlet chamber from the inoperative position preventing flow through said passage means and out of the way of said gas supply means to the operative position in which the high pressure chamber communicates with said passage means and the low pressure chamber communicates with said gas supply means, high pressure valve means in said body between said high pressure chamber and the suction side of said screws, means responsive to the amount of gas used for controlling the position of said body and for moving said body from the inoperative position to the operative position when the volume of gas used falls to a first predetermined amount, means responsive to the volume of gas used for controlling the positions of said valve means and for opening said valve means when the volume of gas used falls to a second predetermined amount below the first predetermined amount, and additional valve means in said body controlling flow from said gas supply means to the suction side of said screws.

5. In a screw compressor including a compressor housing having an inlet end and an outlet end, a male screw and a female screw driven in synchronization in said housing, said screws rotating in opposite directions to establish a suction side and a discharge side, said housing having wall means defining an inlet chamber and an opening connecting the inlet chamber with the suction side of said screws, supply means for supplying gas to said inlet chamber, a receiver, means connecting the outlet end of said housing to said receiver, outlet means connecting said receiver to a point of use for the gas, passage means for connecting said receiver to the inlet chamber of said housing, a flow control body having at least a high pressure chamber and a low pressure chamber, said body having an inoperative position and an operative position, said body being movable within the inlet chamber from the inoperative position preventing flow through said passage means and out of the way of said gas supply means to the operative position in which the high pressure chamber communicates with said passage means and the low pressure chamber communicates with said gas supply means, means responsive to the amount of gas used for controlling the position of said body and for moving said body from the inoperative position to the operative position when the volume of gas used falls to a first predetermined amount, means for moving said body from the operative position to the inoperative position when the volume rises above said predetermined amount, and valve means in said body between said low pressure chamber and the suction side of said screws, the opening and closing of said valve means being responsive to the pressure differential thereacross.

6. In a screw compressor including a compressor housing having an inlet end and an outlet end, a male screw and a female screw driven in synchronizataion in said housing, said screws rotating in opposite directions to establish a suction side and a discharge side, said housing having wall means defining an inlet chamber and an opening connecting the inlet chamber with the suction side of said screws, supply means for supplying gas to said inlet chamber, a receiver, means connecting the outlet end of said housing to said receiver, outlet means connecting said receiver to a point of use for the gas, passage means for connecting said receiver to the inlet chamber of said housing, a flow control body having at least a high pressure chamber and a low pressure chamber, said body having an inoperative position and an operative position, said body being movable within the inlet chamber from the inoperative position preventing flow through said passage means and out of the way of said gas supply means to the operative position in which the high pressure chamber communicates with said passage means and the low pressure chamber communicates with said gas supply means, means responsive to the amount of gas used for controlling the position of said body and for moving said body from the inoperative position to the operative position when the volume of gas used falls to a first predetermined amount, and valve means in said body for controlling flow of low pressure gas from said supply means to the suction side of said screws.

7. In a screw compressor including a compressor housing having an inlet end and an outlet end, a male screw and a female screw driven in synchronization in said housing, said screws rotating in opposite directions to establish a suction side and a discharge side, said housing having wall means defining an inlet chamber and an opening connecting the inlet chamber with the suction side of said screws, supply means for supplying gas to said inlet chamber, outlet means connecting the outlet end of said housing to a point of use for the gas, passage means for connecting said outlet means to the inlet chamber of said housing, a flow control body having at least a high pressure chamber and a low pressure chamber, said body having an inoperative position and an operative position, said body being movable within the inlet chamber from the inoperative position preventing flow through said passage means and out of the way of said gas supply means to the operative position in which the high pressure chamber communicates with said passage means and the low pressure chamber communicates with said gas supply means, means responsive to the amount of gas used for controlling the position of said body and for moving said body from the inoperative position to the operative position when the volume of gas used falls to a first predetermined amount, and valve means in said body for controlling flow of low pressure gas from said supply means to the suction side of said screws.

8. In a screw compressor including a compressor housing having an inlet end and an outlet end, a male screw and a female screw driven in synchronization in said housing, said screws rotating in opposite directions to establish a suction side and a discharge side, said housing having wall means defining an inlet chamber and an opening connecting the inlet chamber with the suction side of said screws, supply means for supplying gas to said inlet chamber, outlet means connecting the outlet end of said housing to a point of use for the gas, passage means for connecting said outlet means to the inlet chamber of said housing, flow control means having an operative position and an inoperative position, said flow control means movable within the inlet chamber from the inoperative position preventing flow through said passage means to the operative position enabling flow of high pressure gas from said passage means to the suction side of said screws, low pressure valve means in said inlet chamber movable from an inoperative position out of the way of said gas supply means to an operative position interposed between said gas supply means and the suction side of said screws, and means responsive to the amount of gas used for controlling the positions of said flow control means and said low pressure valve means for moving them from the inoperative positions to the operative positions when the volume of gas used falls to a predetermined amount.

9. In a screw compressor including a compressor housing having an inlet end and an outlet end, a male screw and a female screw driven in synchronization in said housing, said screws rotating in opposite directions to establish a suction side and a discharge side, a wall adjacent each end of said screws, supply means for supplying gas to said inlet end of said housing, outlet means connecting the outlet end of said housing to a point of use for the gas, passage means for connecting said outlet means to the inlet end of said housing, flow control means adjacent one of said walls and having an operative and an inoperative position, said flow control means movable from the inoperative position blocking said adjacent wall and preventing flow through said passage means to the operative position enabling flow of high pressure gas from said passage means to the suction side of said screws, low pressure valve means operatively associated with said flow control means and movable from an inoperative position out of the way of said gas supply means to an operative position preventing flow from said gas supply means to the suction side of said screws, and means responsive to the amount of gas used for controlling the positions of said flow control means and said low pressure valve means to move said flow control means from its inoperative position to its operative position when the amount of gas used decreases below a predetermined value and to move said pressure valve means from its inoperative position to its operative position when the amount of gas used decreases below a lesser predetermined value.

10. In a screw compressor including a compressor housing having an inlet end and an outlet end, a pair of screws driven in synchronization in said housing, and having a suction side and a discharge side, supply means for supplying gas to said inlet end of said housing, a wall adjacent each end of said screws, outlet means connecting the outlet end of said housing to a point of use for the gas, passage means for connecting said outlet means to the inlet end of said housing, flow control means adjacent one of said walls and having an operative position and an inoperative position, said flow control means movable from the inoperative position blocking said adjacent wall and preventing flow through said passage means to the operative position enabling flow of high pressure gas from said passage means to the suction side of said screws, pressure-responsive valve means operatively associated with said flow control means and effective to control flow of low pressure gas from said gas supply means to the suction side of said screws in response to the pressure differential therebetween, and means responsive to the amount of gas used for controlling the position of said flow control means to move said flow control means from its inoperative position to its operative position when the amount of gas used decreases below a predetermined value.

11. A method of operating a screw compressor which comprises driving the screws at a substantially constant speed, supplying gas to the suction side of said screws, directing the output of high pressure gas from the screws to a remote point of use, decreasing the supply of the gas to the screws when the amount of gas used falls below a predetermined amount, recirculating part of the high pressure gas to the screws when the volume of use drops to a lesser predetermined amount, and continuing to recirculate additional quantities of the high pressure gas as the volume of use drops to still lower predetermined amounts.

12. In a screw compressor including a compressor housing having an inlet end and an outlet end, a male screw and a female screw driven in synchronization in said housing, said screws rotating in opposite directions to establish a suction side and a discharge side, a wall adjacent each end of said screws, supply means for supplying gas to the inlet end of the compressor housing at the suction side of the screws, outlet means connecting the outlet end of the housing to a point of use for the gas, passage means for connecting said outlet means to the inlet end of said housing, control means adjacent one of said walls for opening and closing said passage means, and means responsive to the volume of use for opening and closing said control means and for opening said control means when the volume of gas used drops to a predetermined quantity to enable recirculation of the gas through said passage means.

13. In a screw compressor including a compressor housing having an inlet end and an outlet end, a male screw and a female screw driven in synchronization in said housing, said screws rotating in opposite directions to establish a suction side and a discharge side, a wall adjacent each end of said screws, supply means for supplying gas to the inlet end of the compressor housing at the suction side of the screws, outlet means connecting the discharge end of the housing to a point of use for the gas, passage means for connecting said outlet means to the inlet end of said housing, control means adjacent one of said walls for opening and closing said passage means, means responsive to the volume of use for opening and closing said control means and for opening said control means when the volume of gas used drops to a predetermined quantity to enable recirculation of the gas through said passage means, and pressure-responsive valve means effective to control flow of gas from said supply means to the suction side of said screws at the inlet end when the volume of use drops to a lesser predetermined quantity.

References Cited by the Examiner

UNITED STATES PATENTS

| 849,482 | 4/07 | Machlet | 230—138 |
| 1,616,992 | 2/27 | Ruckstuhl | 230—138 |
| 1,948,907 | 2/34 | Egli | 230—138 |
| 3,088,658 | 5/63 | Wagenius | 230—138 |

FOREIGN PATENTS

| 511,086 | 9/20 | France. |
| 873,949 | 4/42 | France. |
| 509,247 | 7/39 | Great Britain. |

KARL J. ALBRECHT, *Primary Examiner.*

WILBUR J. GOODLIN, *Examiner.*